US012362801B2

(12) United States Patent
Suh et al.

(10) Patent No.: US 12,362,801 B2
(45) Date of Patent: Jul. 15, 2025

(54) METHODS AND SYSTEMS FOR WI-FI SENSING ANNOUNCEMENT

(71) Applicant: HUAWEI TECHNOLOGIES CO., LTD., Shenzhen (CN)

(72) Inventors: Jung Hoon Suh, Kanata (CA); Yan Xin, Kanata (CA); Osama Aboul-Magd, Kanata (CA); Kwok Shum Au, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 377 days.

(21) Appl. No.: 17/836,921

(22) Filed: Jun. 9, 2022

(65) Prior Publication Data

US 2022/0399923 A1 Dec. 15, 2022

Related U.S. Application Data

(60) Provisional application No. 63/210,184, filed on Jun. 14, 2021.

(51) Int. Cl.

| | |
|---|---|
| ***H04W 4/00*** | (2018.01) |
| ***H04B 7/06*** | (2006.01) |
| ***H04L 5/00*** | (2006.01) |
| ***H04W 48/20*** | (2009.01) |

(52) U.S. Cl.

CPC ......... *H04B 7/0626* (2013.01); *H04L 5/0023* (2013.01); *H04L 5/0048* (2013.01); *H04W 48/20* (2013.01)

(58) Field of Classification Search

CPC .... H04L 5/0023; H04L 5/0048; H04W 48/20; H04W 48/16; H04W 84/12

See application file for complete search history.

(56) References Cited

U.S. PATENT DOCUMENTS

| | | | |
|---|---|---|---|
| 2005/0265436 A1 | 12/2005 | Suh et al. |
| 2011/0159866 A1 | 6/2011 | Kim et al. |
| 2012/0026909 A1 | 2/2012 | Seok |
| 2015/0270879 A1 | 9/2015 | Chen et al. |

(Continued)

FOREIGN PATENT DOCUMENTS

| | | |
|---|---|---|
| JP | 2018512768 A | 5/2018 |
| WO | 2021049357 A1 | 3/2021 |

OTHER PUBLICATIONS

IEEE 802.11-21/1896r0, Junghoon Suh et al., NDPA for Sensing, Nov. 2021, 7 pages.

(Continued)

*Primary Examiner* — Abdelnabi O Musa

(57) ABSTRACT

A procedure and frame structure for Wi-Fi sensing is described. An aspect of the disclosure provides a method of sensing. Such a method includes sending, by an initiating station (STA) to one or more responder STAs, a sensing request comprising a sensing announcement frame (SAF) indicating sensing set-up information including frame structure information. The SAF includes at least one field indicating the frame structure information including one or more of: a sensing set-up identifier (ID), an SAF version ID, a sensing session ID, a measurement set-up ID, and a measurement instance ID. The method further includes receiving, by the initiating STA from the one or more responder STAs, one or more responses based on the sensing request.

12 Claims, 11 Drawing Sheets

(56) References Cited

U.S. PATENT DOCUMENTS

| | | | | |
|---|---|---|---|---|
| 2016/0254884 | A1* | 9/2016 | Hedayat | H04B 7/0628 370/329 |
| 2020/0068655 | A1 | 2/2020 | Ghosh et al. | |
| 2020/0136700 | A1* | 4/2020 | Bogale | H04B 7/0456 |
| 2020/0359299 | A1* | 11/2020 | Suh | H04B 7/0413 |
| 2022/0109480 | A1* | 4/2022 | Hao | H04B 7/0626 |
| 2022/0304051 | A1 | 9/2022 | Aboul-Magd et al. | |
| 2023/0254053 | A1* | 8/2023 | Kim | G01S 13/82 370/252 |
| 2023/0262758 | A1* | 8/2023 | Kim | H04B 17/309 370/329 |
| 2023/0319719 | A1* | 10/2023 | Kim | G01S 13/82 370/329 |
| 2023/0319875 | A1* | 10/2023 | Kim | H04W 74/0808 |
| 2023/0353210 | A1* | 11/2023 | Hao | H04B 7/0691 |
| 2024/0064804 | A1* | 2/2024 | Lim | G01S 13/765 |
| 2024/0137813 | A1* | 4/2024 | Kim | G01S 13/87 |

OTHER PUBLICATIONS

IEEE 802.11-22/0153r2, Junghoon Suh et al., Parameters for sub-7 GHz Sensing NDPA, Jan. 2022, 12 pages.

IEEE 802.11-22/0663r1, Junghoon Suh et al., Harmonization for TGbf NDPA, Mar. 2022, 13 pages.

Junghoon Suh (Huawei) et al., "Trellis Coded Quantization for CSI Feedback Part 2: Quantization for the Magnitude of CSI", IEEE 802.11-21/0771r0, May 7, 2021.

* cited by examiner

100

200

400

| PHY Header 402 | MAC Header 404 | Sensing session ID 450 | SAF version ID 452 | Preamble puncturing pattern 442 | FB frame length 444 | DL/UL 406 | No. of sensing frames 408 | BW 410 | STA Info #1 420 | - - | STA Info #n 430 | FEC 414 |

| Ranging | HE | Description |
|---|---|---|
| 0 | 0 | VHT NDPA |
| 0 | 1 | HE NDPA |
| 1 | 0 | Ranging NDPA |
| 1 | 1 | EHT NPA |

FIG. 6
PHY Header 602
MAC Header 604
SSUID 640
Repeated SSUID 641
Preamble puncturing pattern 642
FB frame length 644
DL/UL 606
No. of sensing frames 608
BW 610
STA Info #1 620
STA Info #n 630
FEC 614
612

600

| PHY Header 702 | MAC Header 704 | Sensing session ID 750 | SAF version ID 752 | Repeated Sensing session ID 754 | Repeated SAF version ID 756 | Preamble puncturing pattern 742 | FB frame length 744 | DL/ UL 706 | No. of sensing frames 708 | BW 710 | STA Info #1 720 | - - | STA Info #n 730 | FEC 714 |

700

740: {Sensing session ID 750, SAF version ID 752}
741: {Repeated Sensing session ID 754, Repeated SAF version ID 756}
712: {STA Info #1 720, - -, STA Info #n 730}

800

900

| | | | | |
|---|---|---|---|---|
| B4-B5<br>902 | GI+LTF Size<br>904 | 1 | 2 | Indicates the GI duration and EHT-LTF size:<br>Set to 0 Reserved when used in sensing<br>Set to 1 Reserved when used in sensing<br>Set to 2 to indicate 4xLTF+0.8 μs GI<br>Set to 2 to indicate 4xLTF+0.8 μs GI |

| Scale Ratio 1002 | CSI Coefficient 1004 | Spatial Stream 1006 | RX Chain 1008 |
|---|---|---|---|
| Scale Ratio 1 | CSI Coefficient 1 | 1 | 1 |
| ...... | ...... | ...... | ...... |
| Scale Ratio $N_{SS}$ | CSI Coefficient $N_{SS}$ | $N_{SS}$ | 1 |
| Scale Ratio $N_{SS}$+1 | CSI Coefficient $N_{SS}$+1 | 1 | 2 |
| ...... | ...... | ...... | ...... |
| Scale Ratio 2$N_{SS}$ | CSI Coefficient 2$N_{SS}$ | $N_{SS}$ | 2 |
| ...... | ...... | ...... | ...... |
| Scale Ratio ($N_R$ x $N_{SS}$ ) | CSI Coefficient ($N_R$ x $N_{SS}$ ) | $N_{SS}$ | $N_R$ |

METHODS AND SYSTEMS FOR WI-FI SENSING ANNOUNCEMENT

CROSS-REFERENCE TO RELATED APPLICATIONS

This application claims the priority of U.S. Provisional Patent Application Ser. No. 63/210,184, entitled "METHODS AND SYSTEMS FOR WI-FI SENSING ANNOUNCEMENT" filed on Jun. 14, 2021, the entire contents of which are incorporated herein by reference.

FIELD OF THE INVENTION

The present invention pertains to the field of communication networks, and in particular to a procedure and frame structure for Wi-Fi sensing.

BACKGROUND

Channel state information (CSI) may reflect wireless signal propagation characteristics associated with a link between a transmitter and a receiver at, for example, certain carrier frequencies. CSI measurements may include information in time, frequency, and spatial domains. CSI may be used in sensing procedures, e.g., for identification and detection of human activities and other applications. However, existing sensing procedures may be limited in terms of CSI measurement accuracy. In addition, frame structures and fed-back information used in existing sensing procedures further limit the extent to which the sensing procedures may allow for improved CSI measurements.

Therefore, there is a need for an enhanced procedure and frame structure for Wi-Fi sensing that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An aspect of the disclosure provides a method of sensing for a communication system which utilizes a plurality of spatial streams (SS) for transmission which are received in a plurality of receive (RX) chain pairs. Such a method includes receiving, by a responder station (STA) from an initiating STA, a sensing request. Such a method further includes sending, by the responder STA to the initiating STA, one or more responses based on the sensing request, the response including a channel state information (CSI) feedback frame, the CSI feedback frame including: a CSI coefficient; and a scale ratio.

In some embodiments, the CSI coefficient is computed per spatial stream (SS)-RX chain pair and per sub-carrier. In some embodiments, the scale ratio is computed per stream (SS)-RX chain pair. In some embodiments, the scale ratio defines the range of CSI coefficient for quantization purposes. In some embodiments, the method further includes the responder STA computes a range of CSI coefficients per spatial stream (SS)-RX chain pair and per sub-carrier. In some embodiments, the method further includes the responder STA computes the scale ratio to define the range of CSI coefficients per stream (SS)-RX chain pair.

In some embodiments, the method further includes receiving, by the responder station (STA) from the initiating STA, a sensing announcement frame (SAF) indicating sensing set-up information including frame structure information, wherein the SAF includes at least one field indicating the frame structure information including one or more of: a sensing set-up identifier (ID), an SAF version ID, a sensing session ID, a measurement set-up ID, and a measurement instance ID; and sending, by the responder STA to the initiating STA, one or more responses based on the sensing request. In some embodiments, the method further includes the at least one field includes a first field and a second field, wherein: the first field indicates the sensing session ID, and the second field indicates one or more of: the sensing set-up identifier (ID), the SAF version ID, the measurement set-up ID, and the measurement instance ID. In some embodiments, the one or more fields of the at least one field is repeated. In some embodiments, the at least one field further indicates a preamble puncturing pattern indicating availability or nonavailability of bandwidth.

Another aspect of the disclosure provides a method of sensing. Such a method includes sending, by an initiating station (STA) to one or more responder STAs, a sensing request comprising a sensing announcement frame (SAF) indicating sensing set-up information including frame structure information. The SAF includes at least one field indicating the frame structure information including one or more of: a sensing set-up identifier (ID), an SAF version ID, a sensing session ID, a measurement set-up ID, and a measurement instance ID. The method further includes receiving, by the initiating STA from the one or more responder STAs, one or more responses based on the sensing request.

In some embodiments, the at least one field includes a first field and a second field, wherein: the first field indicates the sensing session ID, and the second field indicates one or more of: the sensing set-up identifier (ID), the SAF version ID, the measurement set-up ID, and the measurement instance ID. In some embodiments, the at least one field is at least 1 byte in length. In some embodiments, the at least one field further indicates a preamble puncturing pattern indicating availability or non-availability of bandwidth. In some embodiments, the preamble puncturing pattern indicates the availability or the non-availability of bandwidth in 20 MHz units. In some embodiments, the at least one field further indicates a feedback frame length for the one or more responses. In some embodiments, the at least one field further indicates a bandwidth of a sensing null data packet (NDP). In some embodiments, one or more fields of the at least one field is repeated.

In some embodiments, the method further includes sending, by the initiating STA to the one or more of responder STAs, a sensing null data packet (NDP), wherein the sensing NDP comprises one or more long training fields (LTFs) where extremely high throughput (EHT) rules are applied. In some embodiments, the at least one field further indicates a bandwidth of the sensing NDP. In some embodiments, the one or more LTFs are 4×LTF type.

In some embodiments, the one or more responses comprises one or more sensing feedback action frames indicating a scale ratio corresponding to a channel state information (CSI) coefficient, wherein the CSI coefficient is per sub-carrier and based on a number of spatial streams and a number of RX-chains.

Another aspect of the disclosure provides a method of sensing. Such method includes receiving, by a responder station (STA) from an initiating STA, a sensing request comprising a sensing announcement frame (SAF) indicating sensing set-up information including frame structure information. The SAF includes at least one field indicating the frame structure information including one or more of: a sensing set-up identifier (ID), an SAF version ID, a sensing session ID, a measurement set-up ID, and a measurement instance ID. The method further includes sending, by the responder STA to the initiating STA, one or more responses based on the sensing request.

In some embodiments, the at least one field includes a first field and a second field, wherein: the first field indicates the sensing session ID, and the second field indicates one or more of: the sensing set-up identifier (ID), the SAF version ID, the measurement set-up ID, and the measurement instance ID. In some embodiments, one or more fields of the at least one field is repeated. In some embodiments, the at least one field further indicates a preamble puncturing pattern indicating availability or nonavailability of bandwidth. In some embodiments, the at least one field further indicates a feedback frame length for the one or more response. In some embodiments, the at least one field further indicates a bandwidth of a sensing null data packet (NDP). In some embodiments, the method further includes receiving, by the responding STA from the initiating STA, a sensing null data packet (NDP), wherein the sensing NDP: comprises one or more long training fields (LTFs) where extremely high throughput (EHT) rules are applied; and are 4×LTF type. In some embodiments, the one or more responses comprises one or more sensing feedback action frames indicating a scale ratio corresponding to a channel state information (CSI) coefficient, wherein the CSI coefficient is per sub-carrier and based on a number of spatial streams and a number of RX-chains.

Other aspects of the disclosure provide for apparatus, and systems configured to implement the methods disclosed herein. For example, wireless stations and access points can be configured with machine readable memory containing instructions, which when executed by the processors of these devices, configures the device to perform the methods disclosed herein.

In some embodiments, the machine readable instructions, which when executed by the STA, configures the STA for computing the CSI coefficient per spatial stream (SS)-RX chain pair and per sub-carrier. In some embodiments, the machine readable instructions, which when executed by the STA, configures the STA for computing the scale ratio per stream (SS)-RX chain pair. In some embodiments, the scale ratio defines the range of CSI coefficient for quantization purposes. In some embodiments, the machine readable instructions, which when executed by the STA, further configures the STA for: computing a range of CSI coefficients per spatial stream (SS)-RX chain pair and per sub-carrier; and computing the scale ratio to define the range of CSI coefficients per stream (SS)-RX chain pair.

In some embodiments, the machine readable instructions, which when executed by the STA, further configures the STA for: receiving, from the initiating STA, a sensing announcement frame (SAF) indicating sensing set-up information including frame structure information, wherein the SAF includes at least one field indicating the frame structure information including one or more of: a sensing set-up identifier (ID), an SAF version ID, a sensing session ID, a measurement set-up ID, and a measurement instance ID; and sending, to the initiating STA, one or more responses based on the sensing request. In some embodiments, the at least one field includes a first field and a second field, wherein: the first field indicates the sensing session ID, and the second field indicates one or more of: the sensing set-up identifier (ID), the SAF version ID, the measurement set-up ID, and the measurement instance ID. In some embodiments, one or more fields of the at least one field is repeated. In some embodiments, the at least one field further indicates a preamble puncturing pattern indicating availability or non-availability of bandwidth.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 9 illustrates an extremely high throughput (EHT)-SIG field according to an embodiment of the present disclosure.

FIG. 10 illustrates scale ratios and CSI coefficients for spatial stream (SS)-RX chain pairs, per sub-carrier, according to an embodiment of the present disclosure.

It will be noted that throughout the appended drawings, like features are identified by like reference numerals.

DETAILED DESCRIPTION

CSI may be used for sensing, e.g., for identification and detection of human activities and other applications. CSI training sequence may be designed to measure the channel characteristics between a transmitter and a receiver. CSI may represent how an electric signal propagates from a transmitter to a receiver and the combined effect of scattering, fading, and power decay with distance of the signal.

As may be appreciated by a person skilled in the art, CSI may reflect wireless signal propagation characteristics associated with a link between a transmitter and a receiver at, for example, certain carrier frequencies. CSI measurements may include information in time, frequency, and spatial domains. CSI measurements may be used for various wireless sensing applications.

Figure 1:
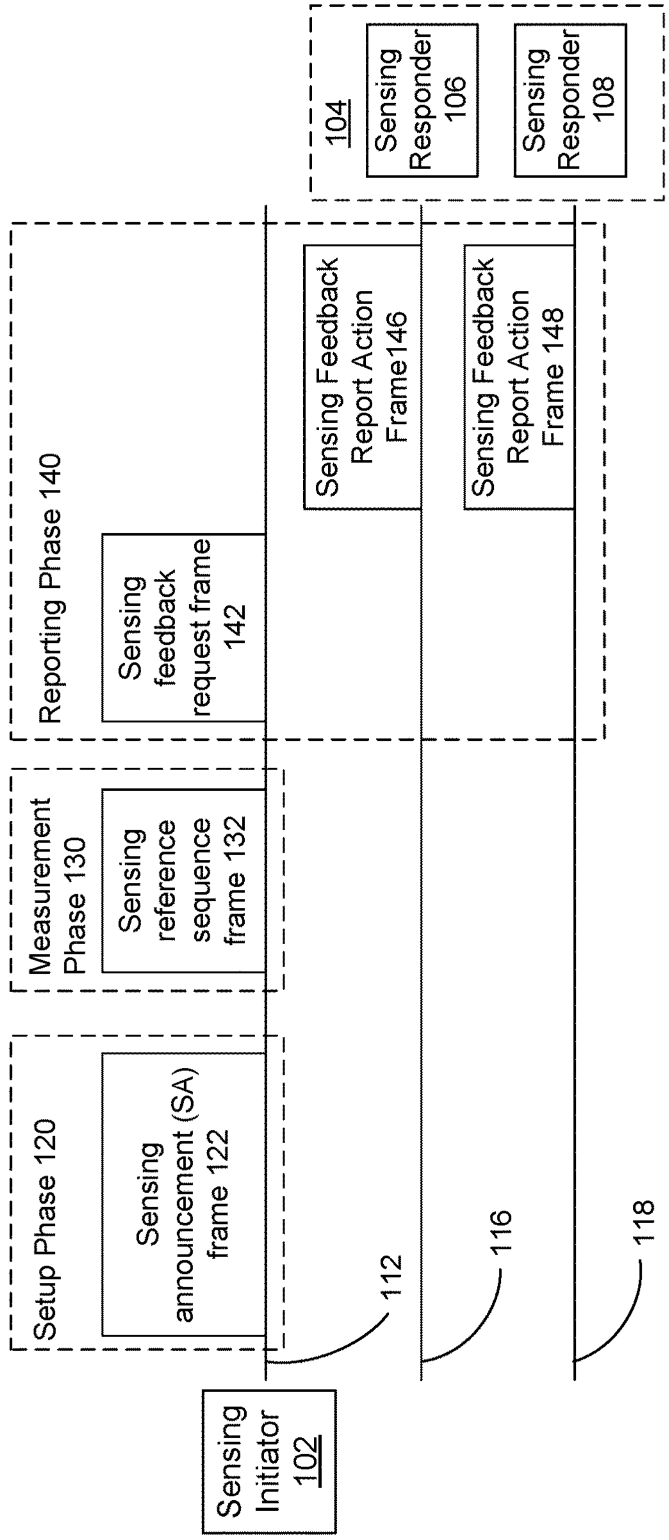
FIG. 1 illustrates a sensing procedure, according to an embodiment of the present disclosure.

FIG. 1 illustrates a sensing procedure, according to an embodiment of the present disclosure. The sensing procedure 100 may be between a sensing initiator 102 (e.g., a transmitter) and one or more receivers (sensing responders 104 (e.g., sensing responder 106 and sensing responder 108)). The sensing initiator 102 may reside at an access point (AP) or at a non-AP station (STA). The sensing initiator 102 may initiate the sensing procedure and determine what devices (for example, one or more sensing responders 104) may be requested to send one or more of sensing frames and sensing feedbacks. The one or more sensing responders 104 may be a Wi-Fi STA capable of performing sensing actions as described herein. Line 112 may represent actions performed by the sensing initiator 102 with respect to time. Lines 212 and 214 may represent actions performed by sensing responders 104 (e.g., respectively sensing responder 106 and 108) with respect to time.

The sensing procedure 100 may be a downlink (DL) procedure. As may be appreciated by a person skilled in the art, DL procedure may refer to embodiments in which one or more sensing frames (e.g., sensing reference sequence frame 132) may be carried in a sensing physical protocol data unit (PPDU) and transmitted by the sensing initiator 102 toward the sensing responders 104. Accordingly, DL direction may refer to the direction toward the sensing responders 104 from the sensing initiator 102.

Similarly, uplink (UL) procedure may refer to embodiments in which one or more sensing frames may be carried in a sensing PPDU and transmitted by the one or more sensing responders 104 toward the sensing initiator 102. UL direction may refer to the direction toward the sensing initiator 102 from the sensing responders 104.

As illustrated, the sensing procedure 100 may include three phases, namely, set-up phase 120, measurement phase 130, and report phase 140. As may be appreciated by a person skilled in the art, the sensing procedure 100 may be similar to the sensing procedure in 802.11bf.

In the setup phase 120, the sensing initiator 102 may announce via the sensing announcement frame (SAF) 122 that a sensing procedure is to begin. In some embodiments, the sensing initiator 102 may send the SAF 122 to the sensing responders 104 (e.g., sensing responders 106 and 108). The SAF 122 may indicate the device identifiers (e.g., STA ID (i.e., association identifier (AIDs)) from which sensing feedback report is expected. The SAF 122 may also group devices for a particular sensing sequence. The SAF 122 may also indicate how many sensing frames are to follow, the frame rate, and other parameters (e.g., Bandwidth).

In the measurement phase, the sensing initiator 102 may send sensing reference sequence frame 132 to sensing responders 104 (e.g., sensing responder 106 and sensing responder 108). The sensing reference sequence frame 132 may correspond to null data packet (NDP) in main stream WiFi (e.g., 802.11b-802.11a/g-802.11n (Wi-Fi 4)-802.11ac (Wi-Fi 5)-802.11ax (Wi-Fi 6)-802.11be (Wi-Fi 7)). As may be appreciated by a person skilled in the art, in the measure phase 130, sensing initiator 102 may transmit frames with reference signal.

In the reporting phase 140, the sensing initiator 102 may send sensing feedback request frame 142 to sensing responders 104 (e.g., sensing responder 106 and sensing responder 108). The sensing feedback request 142 may correspond to one or more trigger frames. Upon receiving the sensing feedback request 142, the sensing responders 104 (e.g., sensing responder 106 and sensing responder 108) may send sensing feedback report action frame 146 and 148 to the sensing initiator 102. The sensing feedback report action frames 146 and 148 may include CSI feedback information.

As may be appreciated by a person skilled in the art, one sensing announcement e.g., SAF 122, may be applied to a plurality of sensing frames transmissions (e.g., sensing reference sequence frame 132 and sensing feedback request frame 142) from the sensing initiator 102 to the sensing responders 104 (e.g., sensing responders 112 and 114) and a plurality of sensing feedback transmissions (e.g., sensing feedback report action frame 146 and 148) from the sensing responders 104 to the sensing initiator 102.

While the sensing procedure 100 illustrates a downlink procedure with parallel feedbacks, a person skilled in the art may appreciate that embodiments described herein are not limited to downlink procedures with parallel feedbacks but may apply to other sensing procedures (e.g., uplink procedures, serial feedback, differential feedback, etc.).

Embodiments described herein may provide for enhanced frame formats in each phase (setup phase 120, measurement phase 130 and reporting phase 140) of the sensing procedure. The frame formats in each phase may be enhanced via additional fields or indications as described herein.

Figure 2:
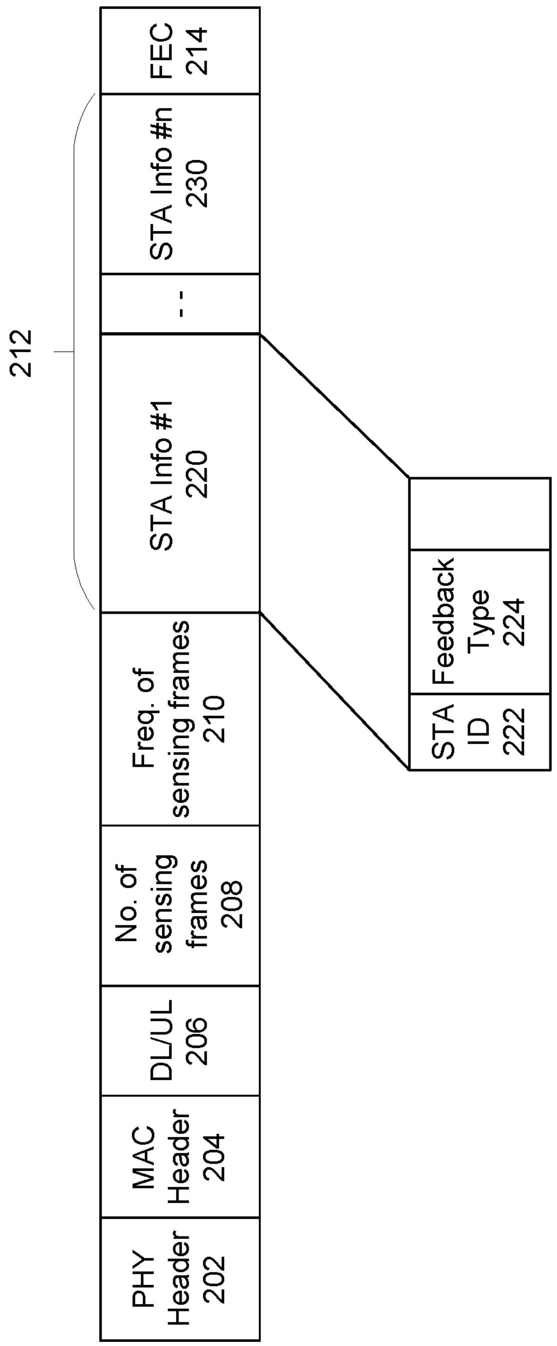
FIG. 2 illustrates a sensing announce frame (SAF) format, according to an embodiment of the present disclosure.

FIG. 2 illustrates a sensing announce frame (SAF) format, according to an embodiment of the present disclosure. The SAF 200 may be similar to the SAF 122 with possible modifications. The SAF 200 may indicate one or more of: a PHY header 202, a MAC header 204, DL or UL field 206, a number of sensing frames field 208, a frequency of sensing frames field 510 and forward error correction (FEC) 214. The DL/UL indicator 506 may indicate whether the requested sensing is DL or UL. The FCS 214 may check for error in the MAC frame. The number of sensing frame 208 may indicate the periodicity of the sensing frames.

The SAF 200 may further comprise one or more STA info fields 212 (e.g., STA-1 info 220, . . . , STA-n info 230) as illustrated. STA info field 212 may refer to, for example, one or more sensing responders 104. In an embodiment, there may be n number of sensing responders, such that the STA info field 212 may comprise n fields corresponding to the n number of sensing responders.

STA Info field, e.g., STA-1 info field 220, may indicate one or more of a STA ID (e.g., association ID) 222 and a feedback type 224 (e.g., phase, amplitude, a combination of phase and amplitude, or other channel information). STA Info field may also indicate one or more subcarriers for which feedback is requested. STA Info field 212 may further indicate other parameters such as resource unit (RU) allocation, transmit/receive antennas, and spatial resource. The RU allocation under STA info field 212 may indicate a bandwidth (BW) for which the CSI measurement feedback (e.g., sensing feedback report action frame 146 and 148) from the one or more sensing responders 104 may be based on.

Figure 3:
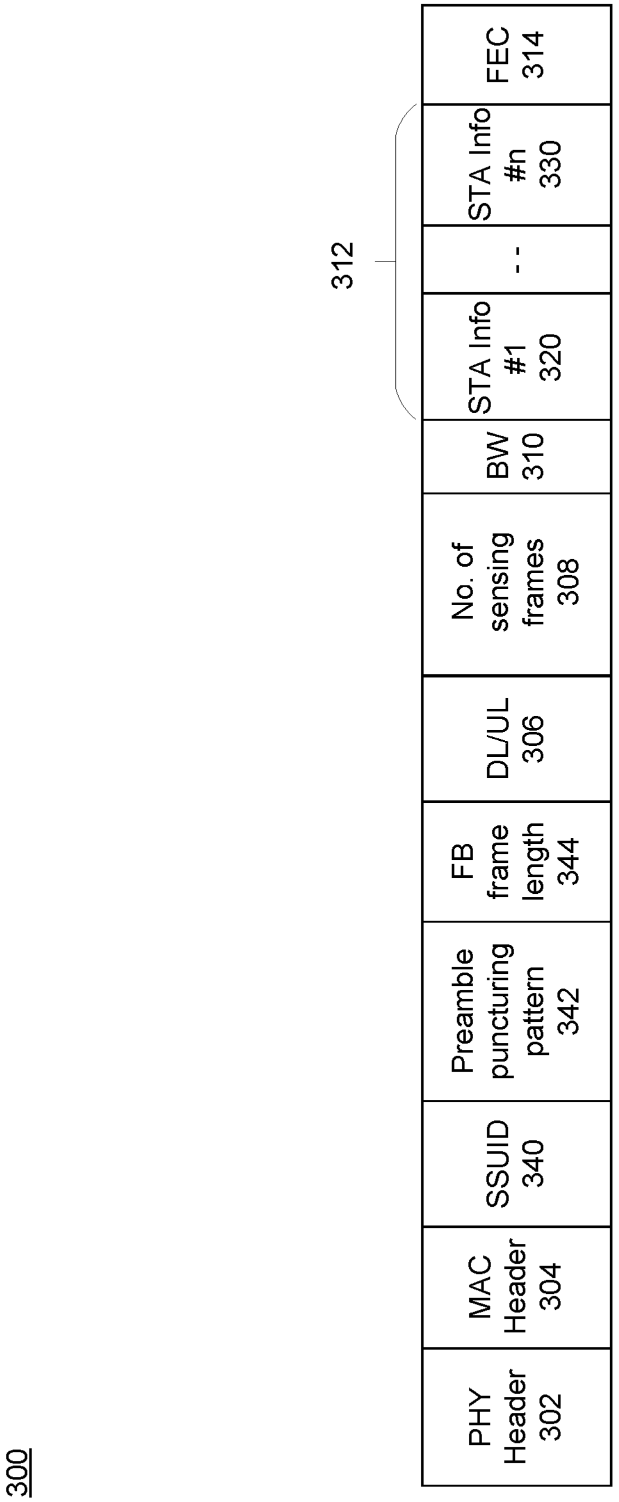
FIG. 3 illustrates an enhanced SAF format, according to an embodiment of the present disclosure.

FIG. 3 illustrates an enhanced SAF format, according to an embodiment of the present disclosure. SAF 300 may be enhanced via one or more additional fields indicating one or more of: sensing set-up ID and SAF version identifier, preamble puncturing patterns, feedback frame length, and bandwidth (BW). As illustrated, SAF 300 may indicate one or more of: a PHY header 302, a MAC header 304, DL or UL 306, a number of sensing frames 308, and FEC 314. The SAF 300 may further indicate one or more STA info fields 312 (e.g., STA-1 info 320, . . . , STA-n info 330) as illustrated.

The SAF 300 may further indicate a sensing set-up ID and SAF version identifier which may be referred to collectively as SSUID 340. The SSUID 340 may indicate sensing set-up information including frame structure information. The SSUID 340 may indicate that the frame is an SAF. The SSUID 340 may further indicate a version identifier to accommodate future amendments of the Sensing Standards. The SSUID may further indicate one or more of: a frame identification, a sensing session ID, a measurement set-up ID, and a measurement instance ID. In some embodiments, the size of the SSUID field may be an octet (8 bits or 1 byte). In other embodiments the size of the SSUID field may be more than 8 bits or any bit size depending on the needs.

The SAF 300 may further comprise a bandwidth (BW) field 310 which may indicate the BW of the NDP (e.g., sensing reference sequence frame 132) which may follow after the SAF. The BW 310 may indicate the BW of the following NDP, and thus the BW 310 may eventually indicate the BW of the CSI measurements that are required. The BW 310 is different from the BW indicated under RU allocation of the STA info field (e.g., STA info field 212 or 312) as described herein. The BW indicated under the RU allocation of the STA info field may be a partial BW of the BW indicated under the BW field 310. Although the BW 310 may indicate the entire BW of the NDP (e.g., sensing reference sequence frame 132), the one or more sensing responders 104 may feedback according to the BW indicated in the RU allocation under the STA info field. As may be appreciated by a person skilled in the art, the BW field 310 may correspond to the frequency of sensing frame field 210 (of SAF 200), and thus BW field 310 is renamed from the frequency of sensing frame field 210.

The STA info field 312 (which may be similar to the STA info field 212) may carry STA specific information which may include a BW of the feedback frame. The BW of the feedback frame may indicate the actual feedback BW for the CSI measurement for each corresponding STA, in case the BW of the feedback frame may differ from the BW of the NDP (indicated by the BW field 310). The BW field 310 may be necessary, for example, when the STA info field 312 does not indicate an RU allocation or a BW for the CSI measurement feedback frame. Since the RU allocation under the STA info field may indicate the actual bandwidth of the feedback frame, an alternative to the RU allocation information may be a sub-field under the STA info field indicating the BW size of the feedback frame.

The SAF 300 may further comprise a preamble puncturing pattern field 342, which may be 2 byte long. The size of the preamble puncturing pattern field 342 may be any size depending on the maximum available BW and signaling method. One way to indicate the preamble puncturing pattern may be a bitmap-based indication, such that each bit may represent the availability of 20 MHz of a maximum available BW of, for example, 320 MHz. For example, a bit "1" may indicate that the corresponding 20 MHz is present, and the bit "0" may indicate that the corresponding 20 MHz is punctured (or otherwise disallowed, for example). Accordingly, the preamble puncturing pattern field 342 may indicate the disallowed sub-channel in 20 MHz unit The SAF 300 may further comprise a feedback (FB) frame length field 344. The FB frame length field 344 may indicate the largest frame length among the CSI Report FB frames (e.g., sensing feedback report action frames 146 and 148) transmitted by the one or more participating sensing responders 104 or receivers. In an embodiment, the CSI report FB frames may be transmitted simultaneously after the trigger frame (e.g., sensing feedback request frame 142).

Figure 4:
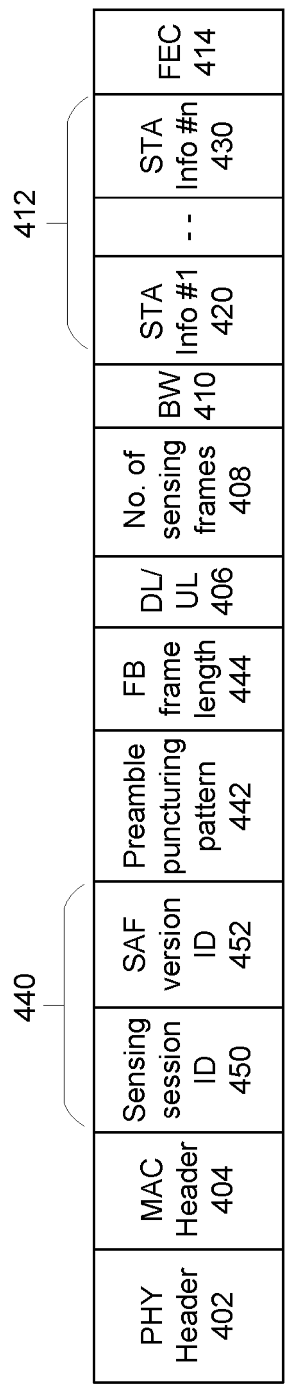
FIG. 4 illustrates another enhanced SAF format, according to an embodiment of the present disclosure.

FIG. 4 illustrates another enhanced SAF format, according to an embodiment of the present disclosure. The SAF 400 may be an alternative to the SAF 300 in which the SSUID field 340 in SAF 300 is split into two or more fields. In an embodiment, the SSUID field 340 in split into two fields namely sensing session ID 450 and SAF version ID 452 as illustrated. Each of the sensing session ID 450 field and the SAF version ID 452 field may be at least 8 bits (1 byte). The sensing session ID field 450 may indicate the sensing session ID. The SAF version ID field 452 may indicate one or more of the following: that the frame is an SAF, a version identifier to accommodate future amendments of the Sensing Standards, a frame identification, a measurement set-up ID, and a measurement instance ID. Accordingly, sensing session ID 450 and SAF version ID 452 may collectively, 440, be similar to SSUID field 340. A person skilled in the art may appreciate that while two fields (450 and 452) are illustrated to indicate the same information as the information indicated by the SSUID 340, in other embodiments more than two fields may be used to indicate the information indicated by the SSUID field 340.

The remaining fields of the SAF 400 may be similar to the corresponding fields in the SAF 300. For example, the SAF 400 may indicate one or more of: a PHY header 402, a MAC header 404, DL or UL 406, a number of sensing frames 408, and FEC 414. The SAF 400 may further indicate one or more STA info fields 412 (e.g., STA-1 info 420, . . . , STA-n info 430) as illustrated. Similar to the SAF 300, SAF 400 may further comprise one or more of: a preamble puncturing pattern field 442, FB frame length field 444, and a BW field 410.

Embodiment may provide for distinguishing the SAF from mainstream 802.11 null data packet announcement (NDPA).

Figures 5A, 5B:
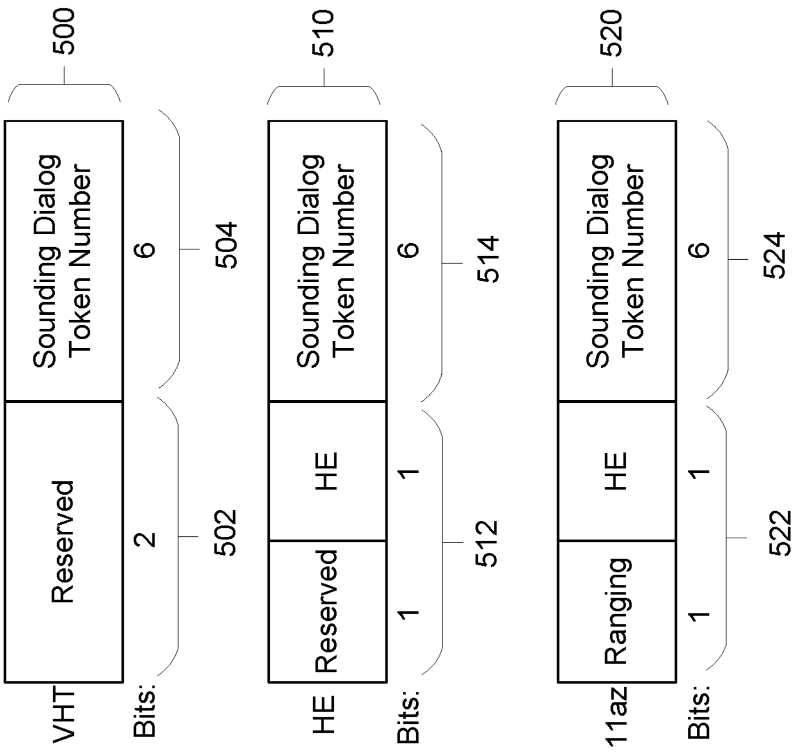
FIG. 5A illustrates examples of null data packet announcement (NDPA) sounding dialog token fields, according to an embodiment of the present disclosure.
FIG. 5B illustrates allocation of the first two bits of NDPA sounding dialog token fields, according to an embodiment of the present disclosure.

FIG. 5A illustrates examples of null data packet announcement (NDPA) sounding dialog token fields, according to an embodiment of the present disclosure. For illustrative purposes, FIG. 5A illustrates VHT NDPA sounding dialog token field 500, HE NDPA sounding dialog token field 510, and 11az NDPA sounding dialog token field 520. As may be appreciated by a person skilled in the art, in the mainstream 802.11 (e.g., 11ac, 11ax, 11be), the NDPA sounding dialog token field may follow the MAC header field (in the NDPA frame). The sounding dialog token field may comprise, for example, 8 bits. The first two bits (e.g., 502, 512, and 522) of the sounding dialog token field (e.g., 500, 510, 520) may be used to indicate the NDPA version (e.g., respectively, VHT NDPA, HE NDPA, and 11az NDPA). The remaining 6 bits (e.g., 504, 514, and 524) may be used to indicate the session of the NDPA.

FIG. 5B illustrates allocation of the first two bits of NDPA sounding dialog token fields, according to an embodiment of the present disclosure. As discussed herein and in reference to FIG. 5A, the first two bits (e.g., 532) of the NDPA sounding dialog token field is used to indicate the NDPA version. For example, the first two bits 532, may be used to indicate very high throughput (VHT) NDPA 534, high efficiency (HE) NDPA 536 (11ax NDPA), Ranging NDPA 508 (11az NDPA), and extremely high throughput (EHT) NDPA 540 (11be NDPA) as illustrated. Accordingly, the first two bits of the sounding dialog token field is already consumed and may no longer be used for any other indication. In order to distinguish the corresponding SAF field (e.g., in SAF 300 and 400) from the NDPA sounding dialog token field, embodiments may provide for repeated SSUID field, as further discussed in reference to FIG. 6.

Figure 6:
FIG. 6 illustrates another enhanced SAF format, according to an embodiment of the present disclosure.

FIG. 6 illustrates another enhanced SAF format, according to an embodiment of the present disclosure. SAF 600 may be similar to SAF 300 with the addition of a repeated SSUID 641 field as illustrated. The repeated SSUID 641 may be identical to the SSUID 640 field. Accordingly, SAF 600 may comprise an SSUID 640 and a repeated SSUID 641 as illustrated.

The remaining fields of the SAF 600 may be similar to the corresponding fields in the SAF 300. For example, the SAF 600 may indicate one or more of: a PHY header 602, a MAC header 604, DL or UL 606, a number of sensing frames 608, and FEC 614. The SAF 600 may further indicate one or more STA info fields 612 (e.g., STA-1 info 620, . . . , STA-n info 630) as illustrated. Similar to the SAF 300, SAF 600 may further comprise one or more of: a preamble puncturing pattern field 642, FB frame length field 644, and a BW field 610.

Accordingly, in an embodiment, a sensing receiver may need to, for example, check the content of two successive fields (e.g., SSUD 640 and repeated SSUID 641) following the MAC header 604 field and if the two successive fields are identical, then the receiver may determine that the frame is an SAF. If the sensing receiver determines that the two successive fields are not identical, then the frame may be indicated to be an NDPA, for example.

In an embodiment, the SSUID field 640 and repeated SSUID field 641 may each be at least 1 byte long and the first two bits of each field 640 and 641 may be set to 00. By doing so, devices may be able to distinguish the SAF 600 from the devices' own NDPA and thus reduce confusion that may occur between the SAF 600 and the devices' own NDPA. As may be appreciated by a person skilled in the art, an example of a device that may mistake the SAF as its own NDPA may be a VHT device, however, the number of such devices may be limited by the time the Sensing AP will be available in the market. Furthermore, in an embodiment, a VHT device may check the STA ID field and if the VHT device finds no matching STA ID, then the VHT device may not do anything.

The remaining bits after the first two bits in SSUID field 640 may be used, if needed, to indicate one or more of: SAF version identification, sensing session identification, measurement set-up ID and measurement instance ID. In some embodiments, in the case the SSUID field 640 is more than two bytes, the remaining bits may be larger than 6 bits.

Figure 7:
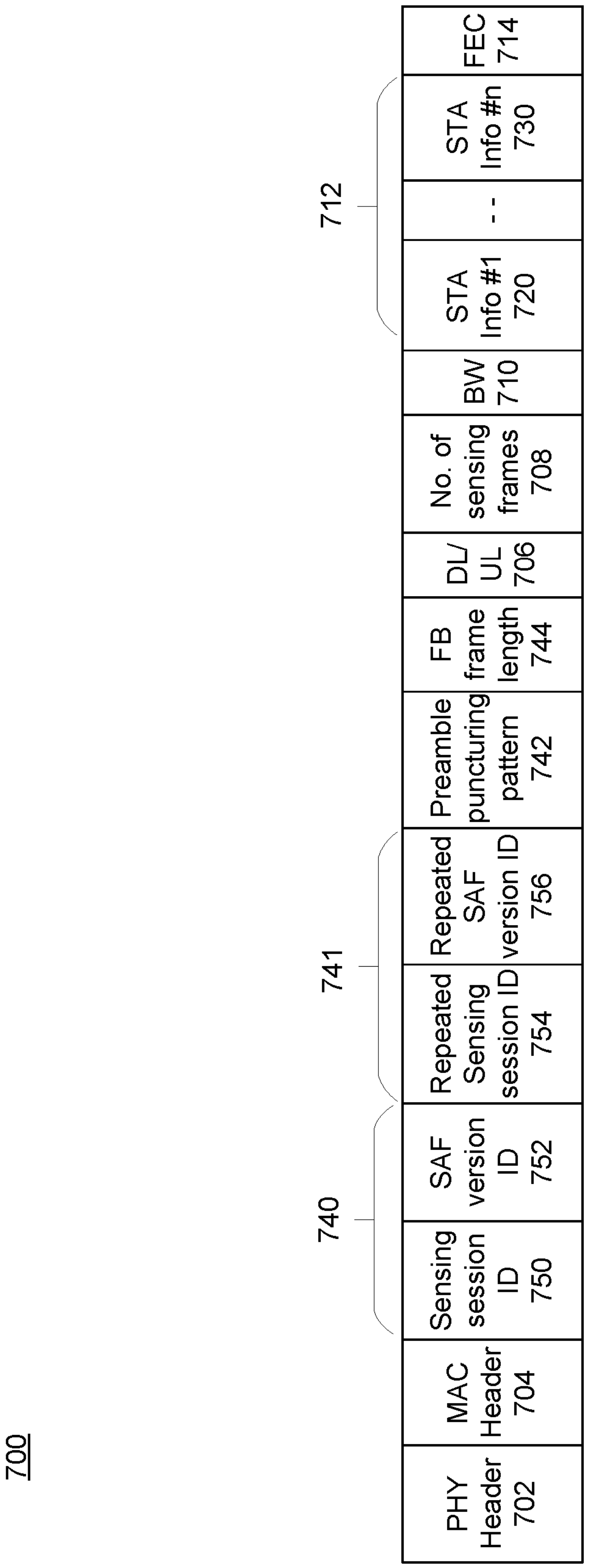
FIG. 7 illustrates another enhanced SAF format, according to an embodiment of the present disclosure.

FIG. 7 illustrates another enhanced SAF format, according to an embodiment of the present disclosure. SAF 700 may be similar to SAF 400 with the addition of repeated sensing session ID 754 field and repeated SAF version ID field 756 as illustrated. The repeated sensing session ID 754 field may be identical to the sensing session ID 750 field, and the repeated SAF version ID 756 field may be identical to the SAF version ID 752. Accordingly, SAF 700 may comprise sensing session ID 750, SAF version ID 752, repeated sensing session ID 754, and repeated SAF version ID 756.

The remaining fields of the SAF 700 may be similar to the corresponding fields in the SAF 400. For example, the SAF 700 may indicate one or more of: a PHY header 702, a MAC header 704, DL or UL 706, a number of sensing frames 708, and FEC 714. The SAF 700 may further indicate one or more STA info fields 712 (e.g., STA-1 info 720, . . . , STA-n info 730) as illustrated. Similar to the SAF 400, SAF 700 may further comprise one or more of: a preamble puncturing pattern field 742, FB frame length field 744, and a BW field 710.

In an embodiment, each of the sensing session ID 450 field and the SAF version ID 452 field may be at least 8 bits (1 byte), and the first two bites of each field 450 and 452 may be set to 00.

With respect to the sensing session ID field 450, the remaining bits after the first two bits may be used to indicate the sensing session ID. With respect to the SAF version ID field 452, the remaining bits after the first two bits may be used to indicate one or more of the following: that the frame is an SAF, a version identifier to accommodate future amendments of the Sensing Standards, a frame identification, a measurement set-up ID, and a measurement instance ID. In some embodiments, in the case that the field 740 (sensing session ID 450 and the SAF version ID 452 field) is more than two bytes, the remaining bits may be larger than 6 bits.

As described similarly in reference to FIG. 6, in an embodiment, a sensing receiver may need to, for example, check the content of two successive fields (e.g., fields 740 and 741) following the MAC header 704 field. As illustrated, field 740 may comprise sensing session ID 750 and SAF version ID 752, and field 741 may comprise repeated sensing session ID 754 and repeated SAF version ID 756. If the two successive fields (e.g., 740 and 741) are identical, then the receiver may determine that the frame is an SAF. If the sensing receiver determines that the two successive fields are not identical, then the frame may be indicated to be an NDPA, for example.

Accordingly, in reference to at least SAF 600 and 700, embodiments described herein may provide for an identification of SAF which may be distinguished from NDPAs of main stream Wi-Fi.

Figure 8:
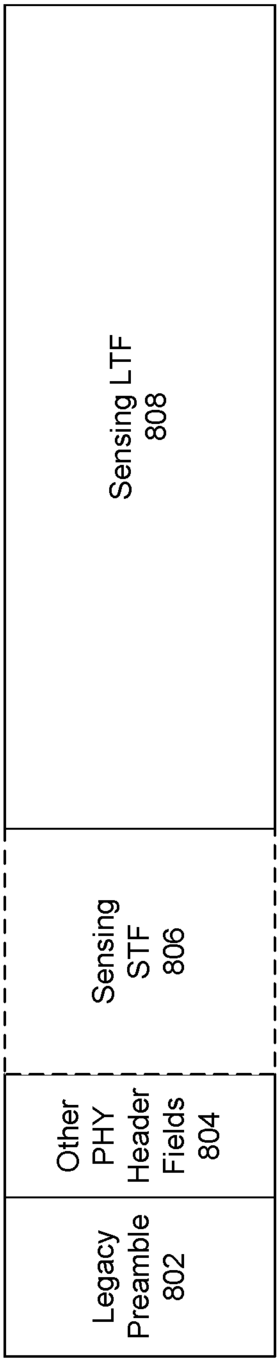
FIG. 8 illustrates a sensing null data packet (NDP) format, according to an embodiment of the present disclosure.

FIG. 8 illustrates a sensing null data packet (NDP) format, according to an embodiment of the present disclosure. The NDP 800 may be similar to the sensing reference sequence frame 132. The NDP 800 may comprise one or more of: a legacy preamble 802, one or more PHY header fields 804, a sensing short training field (STF) 806 and a sensing long training field (LTF) 808 as illustrated. As may be appreciated by a person skilled in the art, sensing LTF 608 may be used for channel estimation and other applications in 802.11. Sensing STF 606 may not be necessary depending on the necessity of automatic gain control (AGC).

In an embodiment, the sensing LTF 808 may reuse the EHT-LTF rules with the same long training sequence (LTS) and numerology as in the 802.11 specification. Accordingly, a larger number of LTF symbols (up to 16 LTFs) than the number of spatial streams (NSS) may be used. The number of LTFs used may be based on a power of 2, for example, for NSS=2, the number of LTFs (N_LTF) may be $2^1=2$, $2^2=4$, $2^3=8$ or $2^4=16$. A person skilled in the art may appreciate that as the N_LTF is increased the channel estimation is improved (e.g., channel estimated gain is obtained). Accordingly, in some embodiments, the sensing NDP comprises one or more long training fields (LTFs) where extremely high throughput (EHT) rules, as per the 802.11 specification are applied.

In an embodiment, the P-matrix for 2×2, 4×4, 8×8 multiple-input and multiple-output (MIMO) case may be reused from the 802.11 specification. The P-matrix for 16×16 may be given as follows:

$$P_{16\times16} = \begin{bmatrix} P_{8\times8} & P_{8\times8} \\ P_{8\times8} & -P_{8\times8} \end{bmatrix}$$

In an embodiment, only the 4×LTF type may be permitted for use (and not, for example, 1×LTF or 2×LTF) in sensing NDP. As may be appreciated by a person skilled in the art, 4×LTF type may allow for a more accurate CSI measurement. Accordingly, embodiments may limit the type of LTF in sensing NDP to 4×LTF type, thereby enforcing the use of 4×LTF in sensing NDP.

In an embodiment, the sensing NDP may be standardized to use 4×LTF type and thus no indication of LTF type may be necessary in the sensing NDP. A higher accuracy for CSI measurement in the sensing session may be required, and thus mandating the use of 4×-LTF for sensing NDP may allow for a more accurate CSI measurement.

In another embodiment, the Other PHY Header Fields 804 may be used to indicate that the LTF type in the sensing NDP is 4×LTF in sensing. For example, two bits in the Other PHY Header Fields 804 may be used to indicate 4×LTF.

In another embodiment, referring to FIG. 9, the entries of GI+LTF size subfield in EHT-SIG may be modified to enforce the use of 4×LTF in sensing. FIG. 9 illustrates an EHT-SIG field according to an embodiment of the present disclosure. The EHT-SIG field 900 may comprise a B4-B5 subfield 902 and a GI+LTF size subfield 904 as illustrated. As mentioned, the entries of GI+LTF size subfield 904 may be modified to enforce the use of 4×LTF in sensing. In an embodiment, the EHT-SIG size field 904 may be set to 2 to indicate 4×LTF+0.8 μs GI. In another embodiment, the EHT-SIG size field 904 may be set to 3 to indicate 4×LTF+3.2 μs GI.

Accordingly, in reference to at least FIG. 8 and FIG. 9, embodiments described herein may provide for improved channel estimation and more accurate CSI measurements.

Embodiments may provide for an enhanced CSI feedback frame (e.g., sensing feedback report action frame 146 and 148). Referring to the reporting phase 140 in FIG. 1, after receiving the sensing feedback request frame 142, the one or more sensing responders 104 may send one or more CSI feedback frame (e.g., sensing feedback report action frame 146 and 148). The CSI feedback frame may comprise a CSI coefficient per spatial stream (SS)-RX chain, and per sub-carrier. The CSI feedback frame may further comprise a scale ratio corresponding to the CSI coefficient per SS-RX chain pair, and per sub-carrier. Accordingly, the scale ratio corresponding to the CSI coefficient per SS-RX chain pair, and per sub-carrier may be fed back by the one or more sensing responders 104 to the sensing initiator 102. A person skilled in the art may appreciate that the scale ratio may be needed by the sensing initiator 102 for decoding the channel parameters. The scale ratio is also called "Carrier Matrix Amplitude Field", or "Linear Scaler".

FIG. 10 illustrates scale ratios and CSI coefficients for spatial stream (SS)-RX chain pairs, per sub-carrier, according to an embodiment of the present disclosure. Referring to the table 10, scale ratios 1002 corresponding to CSI coefficients 1004, per SS-RX chain pair 1010 are illustrated.

For each SS-RX chain pair 1010, the CSI coefficient 1004 may be estimated. As may be appreciated by a person skilled in the art, the CSI coefficient 1004 may be a complex number, which may need to be normalized. Since the estimated channel parameters may be volatile, the range of actual raw CSI coefficient may be large and inadequate for quantization purposes. Accordingly, a certain scale ratio may be needed to define the range of raw CSI coefficient for quantization purposes. As such, for each SS-RX chain pair 1010, both the estimated CSI coefficient and the corresponding scale ratio may be needed to be fed back by the one or more sensing responders to indicate the actual raw CSI measured coefficient.

Referring to table 1000, scale ratios 1002 and CSI coefficients 1004 are mapped for each SS-RX chain pairs 1010 as illustrated. In the table 1000, $N_{SS}$ may refer to the number of SS and $N_R$ may refer to the number of RX chain.

Referring to row 1012, for the case of SS as 1 and RX chain as 1, both the scaling ratio 1 and CSI coefficient 1 may need to be fed back. Similarly, for row 1014, for the case of SS as $N_{SS}$ and RX chain as 1, both the scaling ratio $N_{SS}$ and the CSI Coefficient $N_{SS}$ may need to be fed back. The same approach applies to the remaining SS-RX chain pairs as illustrated.

Embodiments described in reference to FIG. 10 may provide for improved CSI coefficients estimation.

Embodiments described herein may provide for enhanced SAF via one or more fields including SSUID, preamble puncturing pattern, FB frame length, and BW. Embodiments described herein may further provide for improved (more accurate) CSI measurements via using 4×LTF in sensing NDP. Embodiments described herein may provide for further clarification on what information are actually fed back.

Figure 11:
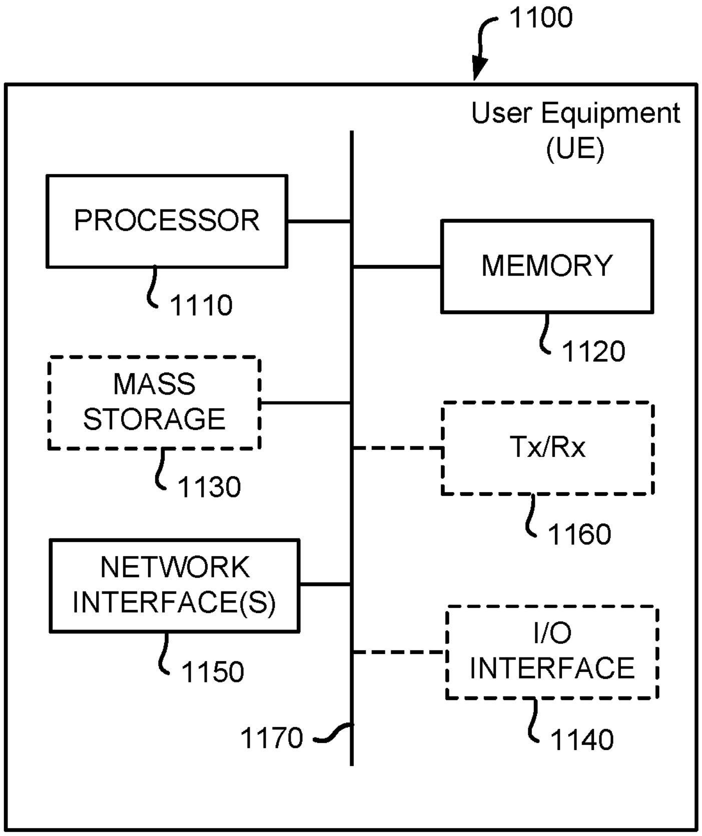
FIG. 11 is a schematic diagram of a user equipment (UE) that may perform any or all of operations of the methods and features explicitly or implicitly described herein, according to different embodiments of the present disclosure.

FIG. 11 is a schematic diagram of UE 1100 that may perform any or all of operations of the methods and features explicitly or implicitly described herein, according to different embodiments of the present disclosure. For example, a computer equipped with network function may be configured as UE 1100.

As shown, the UE 1100 may include a processor 1110, such as a Central Processing Unit (CPU) or specialized processors such as a Graphics Processing Unit (GPU) or other such processor unit, memory 1120, non-transitory mass storage 1130, input-output interface 1140, network interface 1150, and a transceiver 1160, all of which are communicatively coupled via bi-directional bus 1170. According to certain embodiments, any or all of the depicted elements may be utilized, or only a subset of the elements. Further, UE 1100 may contain multiple instances of certain elements, such as multiple processors, memories, or transceivers. Also, elements of the hardware device may be directly coupled to other elements without the bi-directional bus. Additionally, or alternatively to a processor and memory, other electronics, such as integrated circuits, may be employed for performing the required logical operations.

The memory 1120 may include any type of non-transitory memory such as static random access memory (SRAM), dynamic random access memory (DRAM), synchronous DRAM (SDRAM), read-only memory (ROM), any combination of such, or the like. The mass storage element 1130 may include any type of non-transitory storage device, such as a solid state drive, hard disk drive, a magnetic disk drive, an optical disk drive, USB drive, or any computer program product configured to store data and machine executable program code. According to certain embodiments, the memory 1120 or mass storage 1130 may have recorded thereon statements and instructions executable by the processor 1110 for performing any of the aforementioned method operations described above.

Embodiments of the present invention can be implemented using electronics hardware, software, or a combination thereof. In some embodiments, the invention is implemented by one or multiple computer processors executing program instructions stored in memory. In some embodiments, the invention is implemented partially or fully in hardware, for example using one or more field programmable gate arrays (FPGAs) or application specific integrated circuits (ASICs) to rapidly perform processing operations.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disc read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include a number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method of sensing for a communication system which utilizes a plurality of spatial streams (SS) for transmission which are received in a plurality of receive (RX) chains, the method comprising:

receiving, by a responder station (STA) from an initiating STA, a sensing request; and sending, by the responder STA to the initiating STA, one or more responses based on the sensing request, the response including a channel state information (CSI) feedback frame, the CSI feedback frame including:

a CSI coefficient; and a scale ratio;

wherein the scale ratio is computed per spatial stream (SS)-RX chain pair and wherein the CSI coefficient is computed per spatial stream (SS)-RX chain pair and per sub-carrier.

2. The method of claim 1 wherein the scale ratio defines the range of CSI coefficient for quantization purposes.

3. The method of claim 1 further comprising:

receiving, by the responder station (STA) from the initiating STA, a sensing announcement frame (SAF) indicating sensing set-up information including frame structure information, wherein the SAF includes at least one field indicating the frame structure information including one or more of: a sensing set-up identifier (ID), an SAF version ID, a sensing session ID, a measurement set-up ID, and a measurement instance ID.

4. The method of claim 3, wherein the at least one field includes a first field and a second field, wherein: the first field indicates the sensing session ID, and the second field indicates one or more of: the sensing set-up identifier (ID), the SAF version ID, the measurement set-up ID, and the measurement instance ID.

5. The method of claim 3, wherein one or more fields of the at least one field is repeated.

6. The method of claim 3 wherein the at least one field further indicates a preamble puncturing pattern indicating availability or nonavailability of bandwidth.

7. A wireless station (STA) for a communication system which utilizes a plurality of spatial streams (SS) for transmission which are received in a plurality of receive (RX) chains, the STA comprising:

at least one processor; and machine readable memory storing machine readable instructions, which when executed by the STA, configures the STA for:

receiving, from an initiating STA, a sensing request; and sending, by the STA to the initiating STA, one or more responses based on the sensing request, the response including a channel state information (CSI) feedback frame, the CSI feedback frame including:

a CSI coefficient; and a scale ratio;

wherein the scale ratio is computed per spatial stream (SS)-RX chain pair and wherein the CSI coefficient is computed per spatial stream (SS)-RX chain pair and per sub-carrier.

8. The STA of claim 7 wherein the scale ratio defines the range of CSI coefficient for quantization purposes.

9. The STA of claim 7 wherein the machine readable instructions, which when executed by the STA, further configures the STA for:

receiving, from the initiating STA, a sensing announcement frame (SAF) indicating sensing set-up information including frame structure information, wherein the SAF includes at least one field indicating the frame structure information including one or more of: a sensing set-up identifier (ID), an SAF version ID, a sensing session ID, a measurement set-up ID, and a measurement instance ID; and sending, to the initiating STA, one or more responses based on the sensing request.

10. The STA of claim 7 wherein the at least one field includes a first field and a second field, wherein: the first field indicates the sensing session ID, and the second field indicates one or more of: the sensing set-up identifier (ID), the SAF version ID, the measurement set-up ID, and the measurement instance ID.

11. The STA of claim 7 wherein one or more fields of the at least one field is repeated.

12. The STA of claim 7 wherein the at least one field further indicates a preamble puncturing pattern indicating availability or nonavailability of bandwidth.

* * * * *